T. J. MURPHY.
MAGNETIC TESTING DEVICE.
APPLICATION FILED SEPT. 25, 1912. RENEWED JULY 17, 1914.

1,129,584.

Patented Feb. 23, 1915.

WITNESSES:
David J. Walsh
Guy H. Hodges

Thomas J. Murphy
INVENTOR

BY
F. F. Crampton
ATTORNEY

UNITED STATES PATENT OFFICE.

THOMAS JOSEPH MURPHY, OF ROCHESTER, NEW YORK, ASSIGNOR OF ONE-HALF TO JAMES P. B. DUFFY, OF ROCHESTER, NEW YORK.

MAGNETIC TESTING DEVICE.

1,129,584.     Specification of Letters Patent.     Patented Feb. 23, 1915.

Application filed September 25, 1912, Serial No. 722,166. Renewed July 17, 1914. Serial No. 851,646.

*To all whom it may concern:*

Be it known that I, THOMAS JOSEPH MURPHY, a subject of the King of Great Britain, and a resident of Rochester, New York, have invented a new and useful Improvement in Magnetic Testing Devices, of which the following is a specification.

My invention relates to a means for determining the character of a magnetic body as compared with another magnetic body.

It particularly relates to a means for determining the degree of uniformity of the steel composing steel rails. Steel rails have frequently blow holes or crystallized portion, or portions that are softer than the rest of the rail which sometimes causes fractures when the rails are under unusual strain.

The object of the invention is to test the rails and determine its character with respect to some standard.

By my invention a means is provided for repeatedly and rapidly impressing upon one or more coils surrounding the magnetic substance or substances to be tested, an electromotive force which suddenly changes in its intensity. The lag of the current in a coil surrounding the substance, due to the counter-electromotive force produced by the self-induction of the coil and the substance is utilized in determining the relative condition of the substance tested. The lag of the current resulting from the impedance of one part of the circuit is compared with the lag of the current produced by the impedance of another part of the circuit. The indication of the difference of the conditions found in the substance tested and a standard will be accentuated if a pair of coils are located about the substance tested and another pair are located about a standard of some kind and the coils of each pair are placed in the opposite arms of a Wheatstone bridge and a ballistic galvanometer or other electric indicator is connected to the Wheatstone bridge, in the manner well known in the art.

The invention may be embodied in many forms of constructions and arrangements of parts. I have shown one of a number of constructions or systems for the purpose of showing that the invention is operative when embodied in a concrete form and to show a practical application of the invention. The form selected is shown in the accompanying drawings and described hereinafter.

Figure 1:
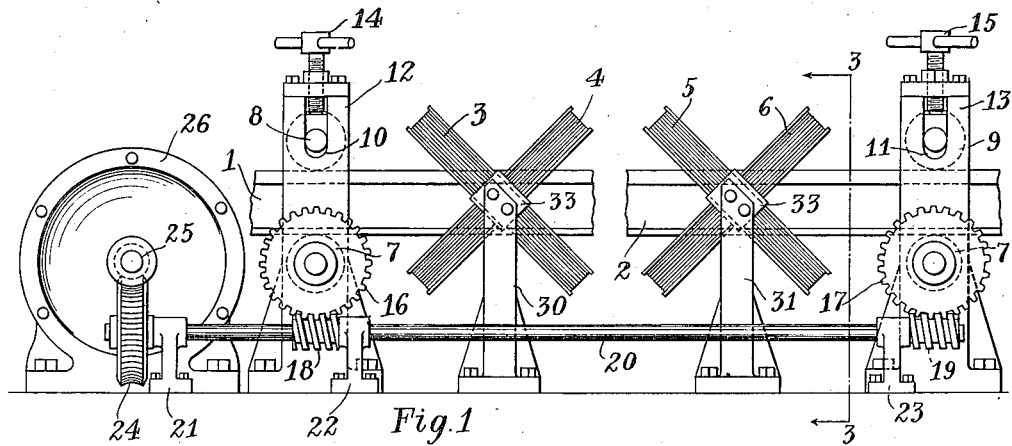
Figure 3:
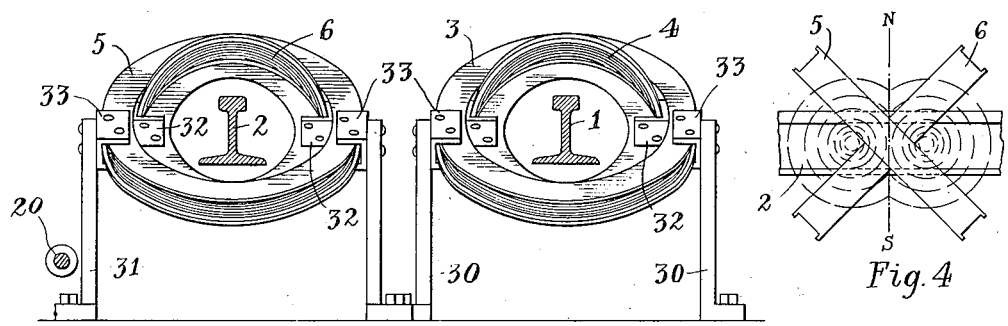
Figure 5:
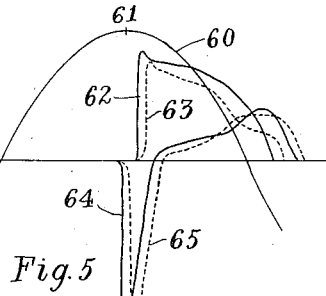
Figure 2:
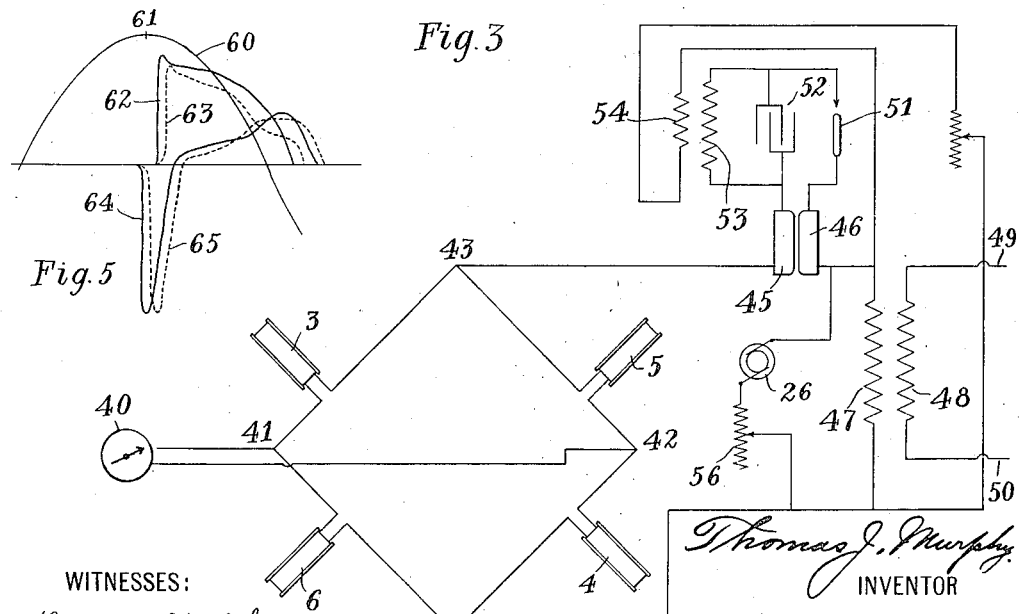

In the drawings, Figure 1 illustrates the construction selected. Fig. 2 shows in a conventional way the electrical connections between the parts of the system. Fig. 3 shows the relation of the coils to the rails. Fig. 4 indicates the intensity of the magnetic flux produced by the coils. Fig. 5 is a diagrammatic indication of the current curves.

Referring to Fig. 1, 1 and 2 are the rails to be compared. They are passed through coils 3, 4, 5 and 6. They are mounted on rollers 7. To give certain frictional engagement between the rollers 7 and the rails pressure rollers 8 and 9 may be used. The rollers 8 and 9 may be shifted in the slots 10 and 11 formed in the supporting frames 12 and 13. The rollers and rails may be pressed downward by the screws 14 and 15 located in the top of the frames. The rollers 7 are connected with worm wheels 16 and 17 which are operated by the screws 18 and 19 located upon the shaft 20. The shaft is mounted in the bearings 21, 22 and 23. A worm wheel 24 is connected to the end of the shaft 20. It is operated by the worm 25 which is connected to the electric motor 26. When the motor rotates the rails are carried through the coils 3, 4, 5, and 6 by the rotation of the wheels 16 and 17. Variations of the speed of the rails may be obtained by varying the speed of the motor by means of rheostat. The coils 3, 4, 5, and 6 are mounted in up-rights 30 and 31. U-shaped pieces 32 are secured to the inner coils and to the inner sides of the outer coils and thereby securing the coils together. Similar U-shaped pieces 33 are secured to the outer coils and to the up-rights 31. If desired the inner coils 4 and 6 may be made oval, or they may be made a little smaller than the outer coils in order that they may be located within the outer coils. The coils are located in planes at right angles to each other to prevent mutual induction. The arrangement tends to spread the flux of the magnetic lines of force and direct its axis across the length of the rail, the magnetic axis being located between the coils and the poles arranged as indicated when the potential of the current is of one kind. The rail is moved along the magnetic centers or across the magnetic axis of the two coils. The field will vary according to the condition of the steel of the rail located in the particular part through which the lines of force of the field pass. If a fluctuating current is used, the current through one pair will lag more than through the other. Because of the difference in inductance in the two parallel circuits they will differ in the time required in which the currents may be built up. This difference may be detected by any suitable electrical device, such as a ballistic galvanometer 40, which is connected to points 41 and 42 of the bridge. The rail may be moved according to the frequency of the fluctuations of the current used. If the fluctuations are frequent the rail may be moved rapidly through the coils by means of the electric motor 26.

Fig. 2 indicates the electrical connections between the parts of the system. The coils are connected in a Wheatstone bridge. The coils located around the parts of the rail compared are connected in opposite legs of the bridge so as to distort the ratio of the bridge if there is any variation in the magnetic susceptibility of the rail. If the permeability of the rail or the hysteretic losses should be abnormal at any part surrounded by either pair of coils the ratio of the conductance of the division of the bridge or the fall of the potential over the parts of the bridge will be greatly varied so that a detector connected to points of the bridge normally having the same potential, will be affected.

In the preferred form of my invention I find that it is exceedingly beneficial to impress on the circuit a current of comparatively high potential produced by allowing the current to flow into the bridge when a variable or an alternating current has reached its maximum. The potential will then suddenly rise in all of the coils but the current will lag behind according to the self-induction of the coils. In the system shown in Fig. 2, the bridge is connected at 43 and 44 with the source of fluctuating current. A half wave rectifier wherein the current may be started at a predetermined time in the wave of the impressed potential by causing a spark to jump across a pair of electrodes and which permits an impressed current to establish an arc across the electrodes at the top of the wave, is exceedingly efficient, as it impresses a sharply rising potential on the circuit of the coils. The bridge is connected to the electrodes 45. The electrode 46 is connected to the secondary coil 47. The point 44 of the bridge is also connected to the coil 47. The secondary 47 receives its current from the coil 48, which is connected to the terminals 49 and 50 of the line. The rheostat 56 may be used to vary the speed of the motor and regulate the movement of the rail according to the frequency of the current. A means is provided for starting an arc between the electrodes. It consists of a means for producing an oscillatory discharge of a condenser across, preferably, two gaps in the circuit of the condenser. One gap is between the electrodes 45 and 46 and the other is between the parts of a suitable device which causes the condenser to be discharged only at desired times or points in the wave of the current produced in the secondary 47. I have shown an electric valve 51. It is connected to the condenser 52. The electrodes 45 and 46 are connected between the valve 51 and the condenser 52. The condenser 52 is charged with a high potential charge by the secondary coil 53 in which is induced a current by the primary 54. The primary 54 receives its current from the coil 47 of the line transformer.

In Fig. 5 is shown conventionally the impressed electromotive force wave. The spark across the electrodes 45 and 46 is started at the point marked 61, preferably the apex or top of the wave. The current 63 immediately begins to flow and rapidly increases in both branches 43, 41 and 44 and 43, 42, and 44 of the bridge. They have the same starting point but owing to difference in impedance of the two parallel circuits they will lag with respect to the current 62 that would normally pass through the circuit without any magnetic material in the coils. The potentials of the two branches at the points 41 and 42 will vary according to the distortion of the ratio of the balance by the impedance of the coils located in opposite sides of the bridge. The potential wave impressed upon the receiver may change sign due to the remanence of hysteretic curves, the counter electromotive force and the extra current being varied by the rate of change of the lines of force set up in the coils. This may be indicated by the curves 64 and 65 which will be very readily detected by the telephone receiver.

The form of the construction in the drawings shown and described herein and which contains the invention may be greatly varied and the connections may be greatly altered and yet the construction and arrangement will still contain the invention.

What I claim is new and desire to secure by Letters Patent is as follows:—

1. In an indicator the combination of a pair of coils adapted to be located around a magnetic substance, a second pair of coils adapted to be located around a second magnetic substance, the said coils being connected so as to constitute opposite arms of a Wheatstone bridge and means for impressing a pulsating current upon the bridge at points each located between two coils belonging to different pairs.

2. In an indicator the combination of a pair of coils adapted to be located around a part of a rail, a second pair of coils adapted to be located around a magnetic substance, the coils of each pair being connected so as to constitute the opposite arms of a Wheatstone bridge, means for impressing a pulsating current upon the bridge at points each located between two coils belonging to different pairs, and means for moving the rail through the said first named coils.

3. In an indicator the combination of a pair of coils adapted to be located around a part of a rail, a second pair of coils adapted to be located around a standard rail, the coils of each pair being connected opposite so as to constitute the arms of a Wheatstone bridge, means for impressing a pulsating current upon the bridge at points each located between two coils belonging to different pairs, and means for moving the first rail through the first named pair of coils.

4. In an indicator the combination of a pair of coils adapted to be located around a rail and at right angles to each other, a second pair of coils, the coils of each pair being connected so as to constitute the opposite arms of a Wheatstone bridge, means for impressing a pulsating current upon the bridge at points each located between two coils belonging to different pairs of coils, and means for moving the rail through the said first named coils.

5. In an indicator the combination of a pair of coils, a second pair of coils adapted to be located around a magnetic substance, the coils each pair being connected so as to constitute opposite arms of a Wheatstone bridge and means for impressing a pulsating current upon the bridge at points located between one of each pair of coils.

6. In an indicator the combination of a pair of coils, a second pair of coils adapted to be located around a magnetic substance, the said coils being so connected as to constitute the arms of a Wheatstone bridge, a rectifier of electric alternating currents connected to the said bridge at points located between one of each pair of coils.

7. In an indicator the combination of a coil adapted to be located about a rail, a standard coil, means for producing a pulsating current in said coils and an electric indicating means adapted to determine the lag of current produced by the magnetic condition of the rail, means for continuously moving the said rail through the said first named coil.

8. In an indicator the combination of a coil adapted to be located about a rail, means for moving the rail through the said coil, a source of pulsating current connected to the said coil and an electric indicating means adapted to indicate variations of the lag in the said coil as the rail is moved with respect to the coil.

In testimony whereof, I have signed my name to this specification in the presence of two subscribing witnesses.

THOMAS JOSEPH MURPHY.

Witnesses:
   ROBERT B. COCHRANE,
   B. P. WAYNE.